United States Patent

[11] 3,533,342

[72] Inventor John H. McMillin
116 Hollywood, Monroe, Michigan 48161
[21] Appl. No. 632,742
[22] Filed April 21, 1967
[45] Patented Oct. 13, 1970

[54] SIMULTANEOUS-EXPOSURE STEREOPHOTOGRAPHIC FUNDUS CAMERA
2 Claims, 14 Drawing Figs.
[52] U.S. Cl. .................................................. 95/18, 95/42
[51] Int. Cl. .................................................. G03b 35/08
[50] Field of Search .................................... 95/18, 42

[56] References Cited
UNITED STATES PATENTS
2,586,973 2/1952 McMillin .................... 95/42
2,639,653 5/1953 Fischer ........................ 95/18

OTHER REFERENCES
Donaldson - A New Camera for Stereoscopic Fundus photography - Archives of Ophthalmology vol. 73.22 pp. 253– 267

Primary Examiner—Norton Ansher
Assistant Examiner—Richard M. Sheer
Attorney—Barthel and Bugbee ABSTRACT: A stereophotographic fundus camera is disclosed wherein the exposures for both views of the same eye at separated distances for subsequent stereoscopic viewing are made simultaneously side-by-side upon the same film in proper arrangement for viewing without subsequent juxtaposition. The nose of the camera contains a light masking disc or wall with three apertures therein, two of which are upper, laterally spaced apertures and the third of which is a lower aperture immediately below and midway between the upper apertures. Illumination of the fundus for focusing is made by light from a single electric light bulb proceeding by way of a condenser and collimating lens system through the lower hole into the eye with the light passing through the flash bulb which is to be subsequently ignited for making the exposure. The returning ray bundles after reflection from the fundus and refraction through the ocular optical system pass through the two upper laterally spaced holes in the mask. The thus-separated ray bundles pass through rhomboidal prisms, thence through separate focusing objective optical systems, including a second set of rhomboidal prisms and focusing components of the objective optical system, to laterally spaced stationary mirrors which reflect the rays upward to a swinging front surface mirror. The latter in its upper position serves as an occluding shutter closing laterally spaced openings into the film chamber immediately overhead, and at the same time reflecting the rays to and through the laterally spaced eye pieces of the viewing optical system employed for visual observation and focusing. This swinging mirror, when swung down into a substantially vertical position, energizes the flash bulb to make the exposure and opens the film chamber to permit the images of the fundus to be projected onto the laterally spaced areas or "frames" of the film and, when swung upward, closes the film chamber. Transporting of the film to present a new pair of frames is performed in a conventional manner. The camera nose containing the masking disc rests, during operation, in a recess in the front of an apertured speculum curved rearwardly to fit under the eyelids and against the sclera of the eye being photographed, after the eye has been anaesthetized to tolerate the presence of the speculum, and its pupil dilated by a mydriatic.

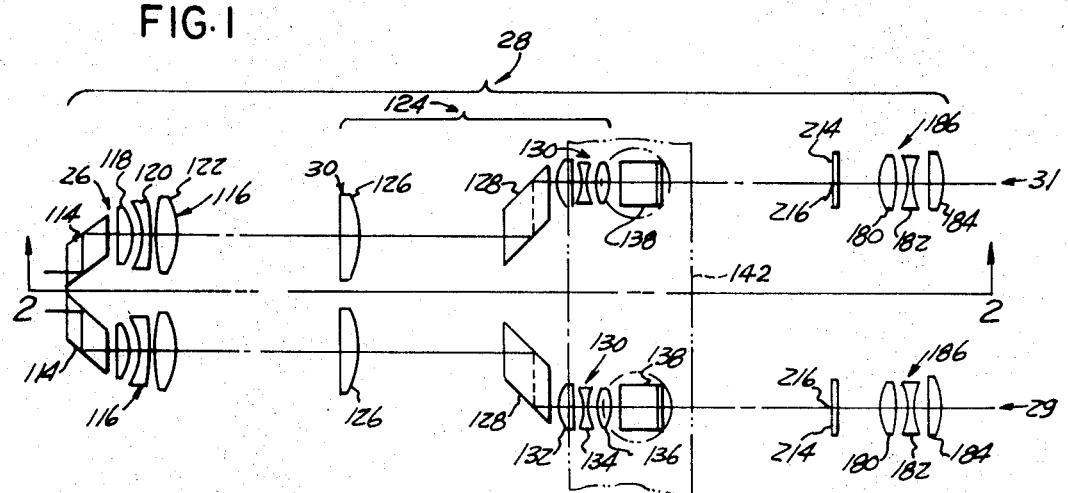
FIG. 1
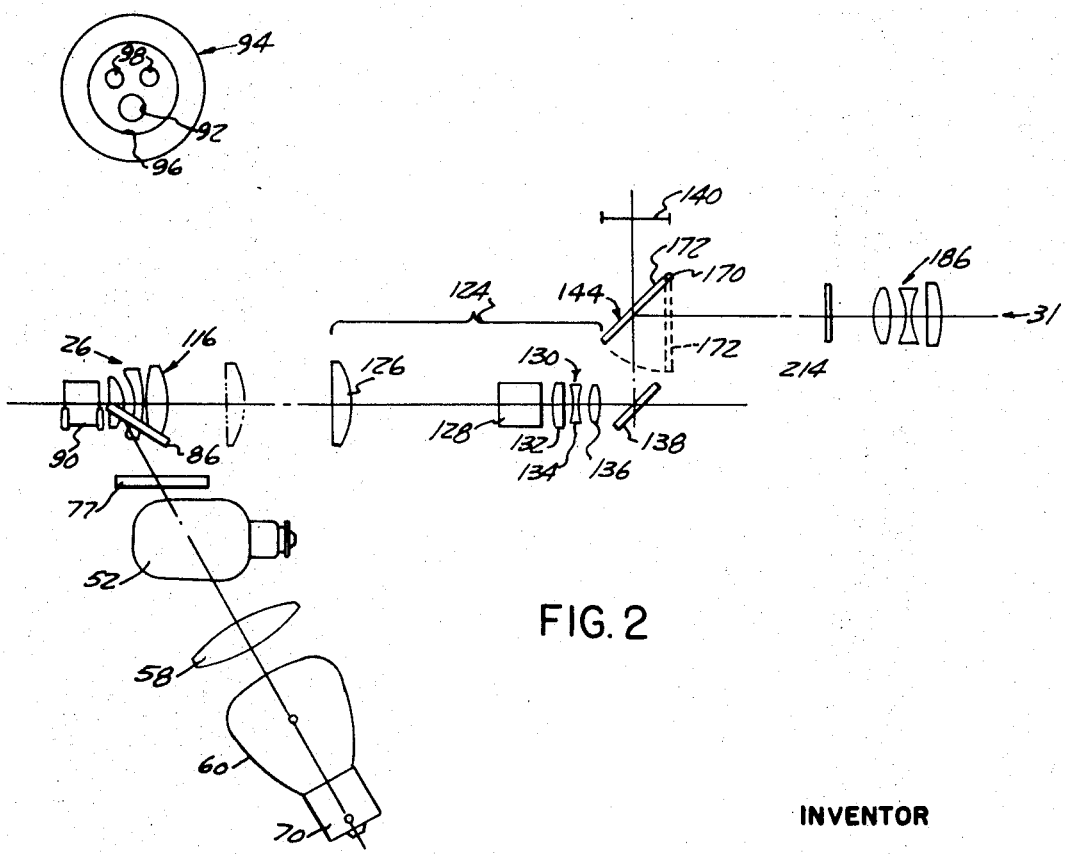
FIG. 6
FIG. 2
INVENTOR
JOHN H. McMILLIN
BY Barthel & Bugbee
ATTORNEYS

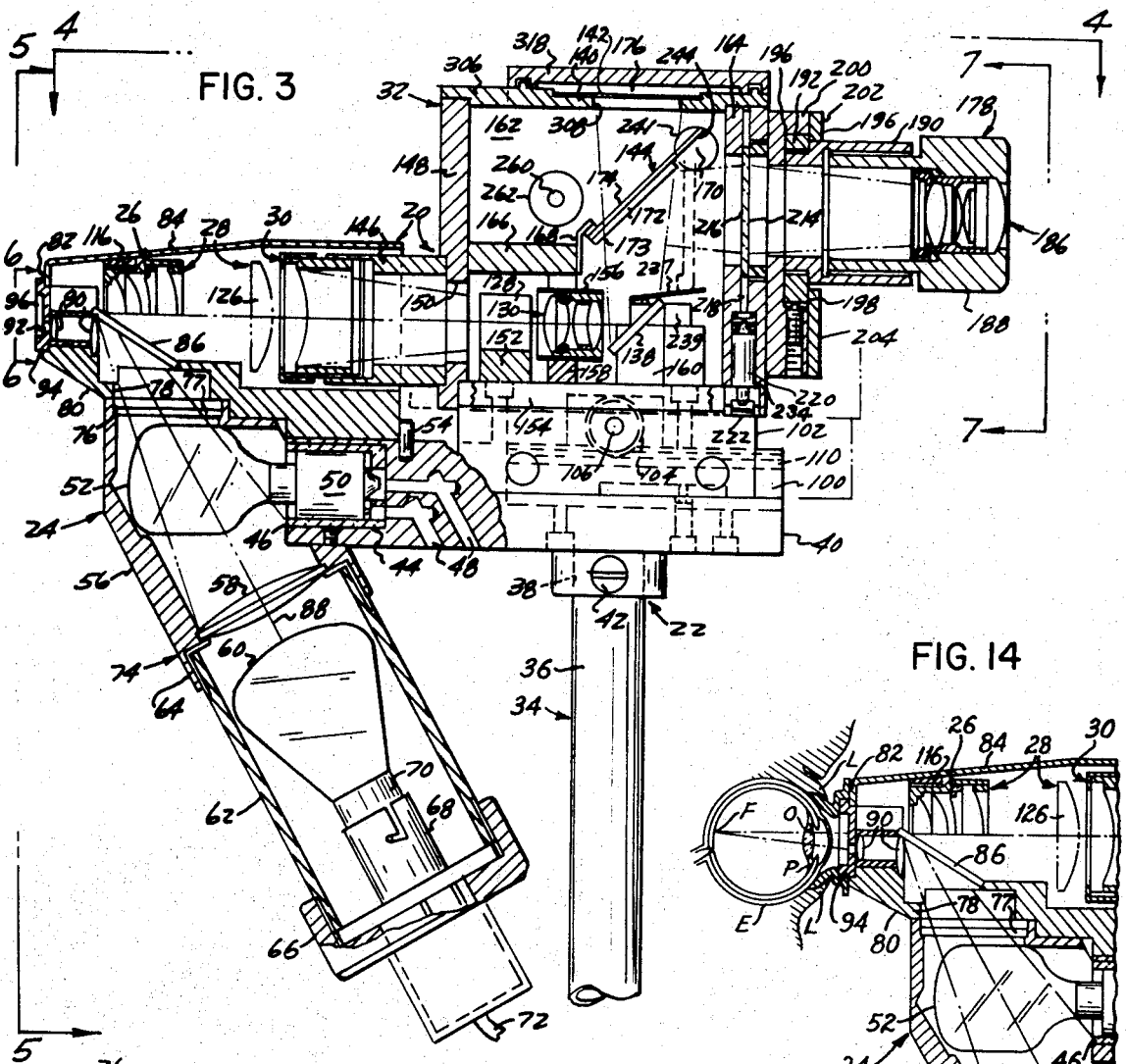
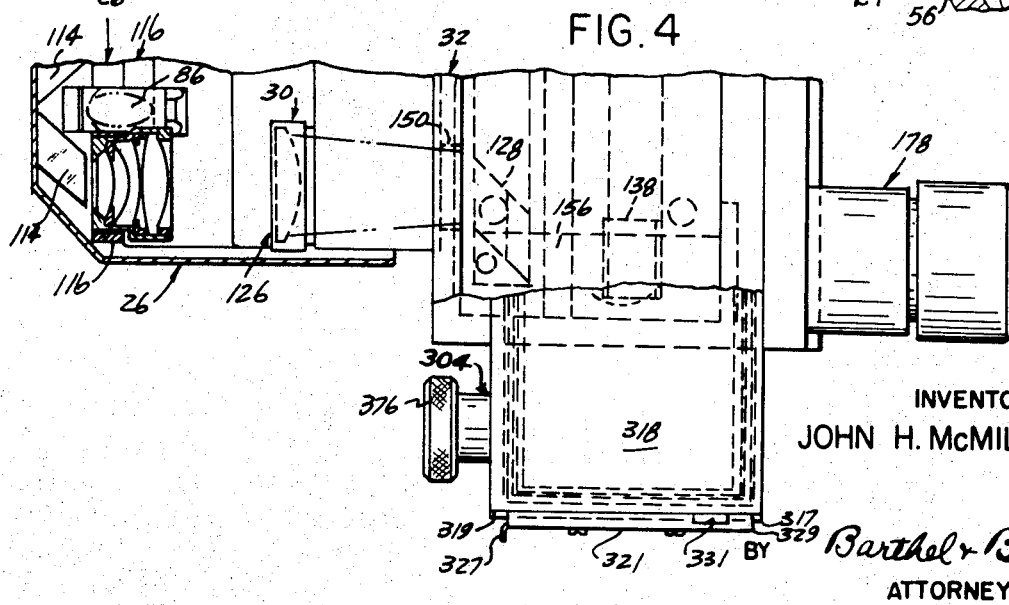

INVENTOR
JOHN H. McMILLIN

BY Barthel & Bigbee
ATTORNEYS

INVENTOR
JOHN H. McMILLIN

BY Barthel & Bugbee
ATTORNEYS

SIMULTANEOUS-EXPOSURE STEREOPHOTOGRAPHIC FUNDUS CAMERA

Prior stereophotographs of the fundus were made with a single frame camera which was shifted laterally between successive exposures to make the two laterally separated views necessary for steroscopic viewing. This necessarily presupposed that the eye would remain immovable and its condition unchanged between exposures, assumptions which were not always valid. Prior efforts to simultaneously expose these two stereoscopic views have been obstructed by the difficulty of getting adequate illumination into the eye and adequate sizes of ray bundles emerging from the eye after reflection from the fundus, even when the pupil of the eye has been dilated. The sole example of a simultaneous exposure stereoscopic fundus camera known to this inventor was that described and illustrated in Archives of Ophthalmology, Volume 73, No. 2 in an article by David D. Donaldson, M.D. entitled "a New Camera for Stereoscopic Fundus Photography" on pages 253 to 267 thereof.

SUMMARY OF THE INVENTION

This instrument is both a binocular (stereo) ophthalmoscope and a stereo fundus camera. As the image of the fundus is automatically erected by the optical system within the camera, it is seen by the ophthalmologist as it would appear to him when seen through a direct opalmoscope, with the added value of three-dimensional viewing. For these reasons, the present camera produces stereoscopic color slides which can be viewed immediately after development without requiring image juxtaposition, thereby reducing the time and labor previously required in preparing stereoscopic slides. The present camera, by providing simultaneously exposed stereoscopic color photographs of the fundus, thereby eliminates the delays in moving prior cameras the stereoscopic separation distances between successive exposures. By this camera, the ophthalmologist photographically records in three-dimensional color the details of the fundus with such accuracy that progress pictures taken at intervals provide an internist with periodic records, either of further degeneration or, hopefully, of improvement after treatment, especially in cases of systemic disease in which the fundus findings are the most accurate guide to prognosis, as in arterial hypertension of in diabetes. The speculum brings the nose of the camera the closest to the anterior corneal surface without ever touching it. It thus properly positions the camera, prevents interference from blinking, and with the aid of the target, assures that all pictures will be identical except for individual differences or pathological changes, for fundus markings have been held to be as characteristic as fingerprints. Moreover, the use of the so-called M-3 flash bulb instead of the more expensive and complicated electronic flash tube simplifies both the construction and operation of the camera.

In the drawings:

FIG. 1 is a schematic top plan view of the optical system of a simultaneous exposure stereophotographic fundus camera, according to one form of the invention;

FIG. 2 is a central vertical section through the stereophotographic fundus camera optical system of FIG. 1, taken along the line 2–2 therein;

FIG. 3 is a central vertical section through the stereophotographic fundus camera employing the optical system of FIGS. 1 and 2, taken along the line 3–3 in FIG. 5;

FIG. 4 is a top plan view of one half of the stereophotographic fundus camera of FIG. 3, taken along the line 4–4 in FIG. 3, the other half being identical but of opposite arrangement;

FIG. 6 is a detail front elevation of the camera nose masking disc of FIG. 3, looking in the direction of the arrows 6–6 therein;

FIG. 14 is a diagrammatic vertical section identical with the upper left-hand portion of FIG. 3, showing the nose of the camera resting against a speculum which in turn engages the marginal portion of the eyeball beneath the eyelids.

Figure 5:
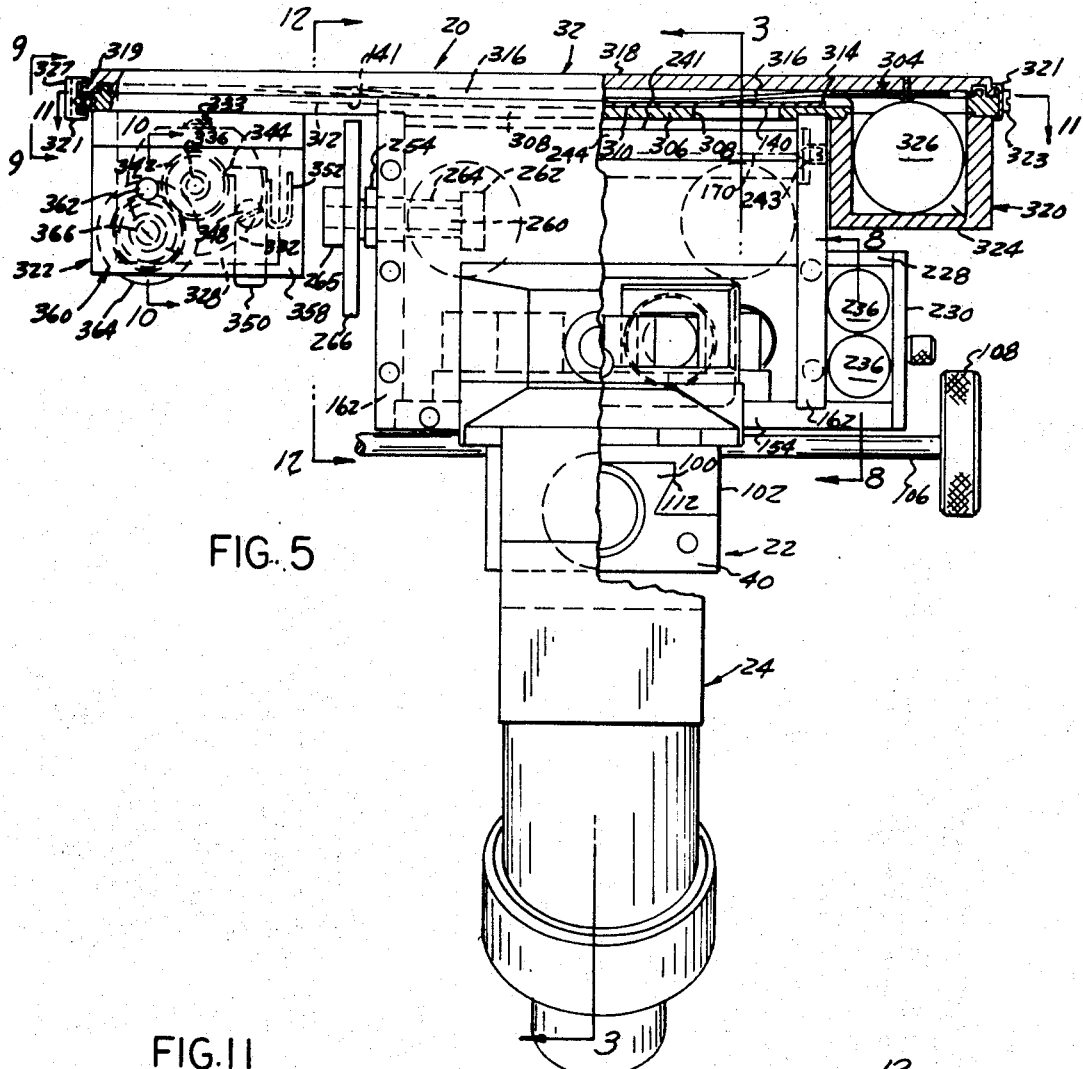
FIG. 5 is a front elevation partly in section of the stereophotographic fundus camera taken along the line 5–5 in FIG. 3, with details of the shutter mechanism, shown fully in FIGS. 12 and 13, omitted to simplify the disclosure.

Referring to the drawings in detail, FIGS. 3, 4 and 5 show a simultaneous exposure stereophotographic fundus camera, generally designated 20, of the present invention as consisting generally of a supporting structure 22 carrying an illuminating system 24 and also a stationary optical unit 26 of a stereophotographic and viewing optical system 28. The latter includes a movable optical unit 30 mounted in and traveling unitarily with a movable camera housing 32. The stereoscopic photographic and viewing optical system 28 (FIG. 1) consists of two identical subsystems 29 and 31 arranged in two laterally spaced oppositely offset predominantly parallel paths. These subsystems, as will be evident from the drawings and description below, focus a pair of independently erected images in a focal plane through which the film emulsion surface passes and in properly separated spacing for stereoscopic viewing.

ILLUMINATING SYSTEM

The supporting structure 22 includes a stand 34 of which only the upright post 36 is shown. Any suitable conventional stand may be used, preferably the swinging arm of a refracting stand or the conventional tripod stand used in physical and ophthalmological instruments. The upper end of the post 36 is seated in a socket 38 in an elongated horizontal base 40 and clamped therein as by the clamping screw 42. The socket 38 is formed in a boss on the base 40, the forward end of which is counterbored at 44 (FIG. 3) to receive a flash bulb socket 46 forming a part of the illuminating system 28, and drilled as at 48 for the passage of wires (not shown) leading to the socket contact for engaging the base 50 of a conventional transparent flash bulb or film-exposure light emitter 52. Rearwardly and above the flash bulb socket 46, the base 40 is drilled to receive a stop pin 54 for limiting the forward travel of the camera housing 32 containing the movable optical unit 30.

Bolted or otherwise removably secured to the foreward end of the base 40 is an upper lamp house 56 enclosing the flash bulb 52 and removable for replacement of burned out flash bulbs 52. Mounted in the upper lamp house 56 is a condensing lens 58 for collecting the light rays from an electric light bulb or viewing light emitter or illuminator 60. The electric light bulb 60 in turn is housed in a lower lamp house 62 joined at 64 to the upper lamp house 56 and having a lower cup-shaped head 66 closing its lower end. Mounted on the upper inner side of the head 66 is an electric lamp socket 68 adapted to receive the base 70 of the electric lamp bulb 60 and supplied with electric current through a conductor cable 72 leading to a source of low-voltage electric current (not shown). Such low voltage electric current is conveniently supplied from the low voltage winding of a conventional stepdown transformer, the high voltage winding of which is connected to a conventional house lighting circuit outlet (not shown). Such low voltage is conveniently six volts or twelve volts for safety reasons and also is employed to "fire" the flash bulb 52 at the proper instant by way of wires through the passages 48, as explained more fully below.

The upper and lower lamp houses 56 and 62 collectively form an illumination housing 74 which is so mounted on the base 40 as to be slidable horizontally to permit access to the flash bulb 52 in order to replace it after firing. The upper end of the upper lamp house 56 is provided with a shouldered opening or window 76 adapted to receive an optical filter 77 optionally used, and aligned with a corresponding opening or window 78 leading into the fixed lower part 80 (FIG. 3) of a stationary optical housing 82, the upper part 84 of which is removable to gain access to the stationary unit 26 of the stereophotographic optical system 28. Mounted in the lower part 80 of the stationary optical housing 82 above the opening 78 is a front surface mirror 86 so inclined relatively to the axis 88 of the illuminating system 24 as to reflect the ray bundle from the condenser 58 through an illuminating system objective or projection lens 90, such as the two-component lens shown in the upper left-hand corner of FIG. 3, and thence through the lower central aperture 92 in an opaque mask disc 94 into the interior of the eye being photographed. The masking disc 94 not only screens the camera against the entrance of extraneous undesired light reflected from the cornea of the eye being photographed but also serves as a locating element for the camera in the manner described below.

Figure 7:
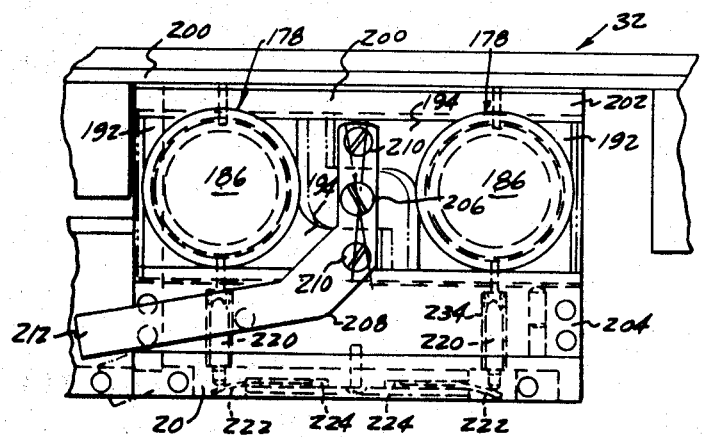
FIG. 7 is a fragmentary rear elevation of the upper portion of the stereophotographic fundus camera, looking in the direction of the arrows 7–7 in FIG. 3.
Figure 10:
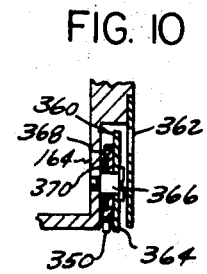
FIG. 10 is a fragmentary vertical longitudinal section through the rear wall of the film transport winding compartment, taken along the line 10–10 in FIG. 5.
Figure 8:
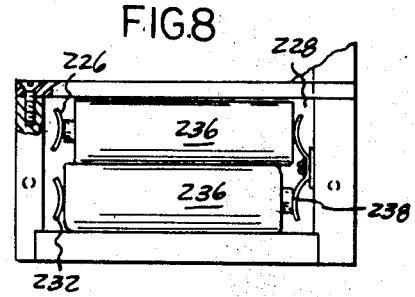
FIG. 8 is a fragmentary vertical longitudinal section through the battery compartment, taken along the line 8–8 in FIG. 5.

The masking disc 94 (FIG. 6) is circular and has a circular recess 96. The lower central aperture or illuminating light exit aperture 92 opens into the recess 96 below the center thereof, whereas above and on opposite sides of that center are two horizontally spaced closely adjacent returning light entrance apertures 98 through which passes the light reflected from the fundus and refracted by the optical system of the eye, and enters the stereophotographic and viewing optical system 28. The masking disc 94 fits into a corresponding recess in an apertured speculum curved to fit the sclera of the eye under examination and having its margin adapted to extend beneath the eyelids. Such a speculum is shown in FIGS. 6, 7 and 8 of my U.S. Pat. No. 2,586,973 issued Feb. 26, 1952 for "Fundus Camera Including Eye Fixation Means."

PHOTOGRAPHIC AND VIEWING OPTICAL SYSTEM

The base 40 (FIGS. 3 and 5) is provided with an elongated central upstanding dovetail guide rib 100 over which a movable dovetail slide 102 snugly but slidably fits. Journaled transversely in the slide 102 is a pinion 104 on a shaft 106 terminating in a focusing knob 108 (FIG. 5). The dovetail guide rib 100 is centrally grooved for the major portion of its length to receive a rack bar 110 (FIG. 3) bolted therein from beneath and having teeth meshing with the pinion 104. The slide 102 is in the form of an elongated block with the downwardly facing dovetail groove 112 thereof extending from end to end (FIGS. 3 and 5). The movable camera housing 32 is bolted to the dovetail slide 102 to move unitarily therewith in response to the rotation of the focusing knob 108 and contains the movable unit 30 of the optical system 28.

The stationary optical unit 26 (FIGS. 1 to 4 inclusive) is mounted in the stationary housing 82 and consists of a pair of oppositely-inclined rhomboidal prisms 114 which receive the two pencils or rays emerging from the two entrance apertures 98 and reflect them through objective lenses 116, which are focused directly upon the fundus, in combination with the optical system of the eye. Each objective lens 116 consists of a plano-convex forward element 118, a concavo-convex intermediate element 120 and a biconvex rear element 122 separated by air spaces. The movable optical unit 30, on the other hand, likewise is paired and consists of a pair of image-erecting subsystems 124, each including a plano-convex field lens 126, a rhomboidal prism 128, and an air-spaced triple-element lens 130, each consisting of a plano-convex forward element 132, a biconcave intermediate element 134, and a biconvex rearward element 136. From each triple element lens 130, the ray pencils are reflected perpendicularly upward by a pair of front surface stationary mirrors 138 to the image plane or focal plane 140 (FIG. 2) occupied by the front emulsion surface 141 of the photographic film 142 (FIGS. 5 and 11) unless barred from doing so by a swinging mirror-shutter 144 (FIG. 3) described below.

Each field lens 126 is mounted at the forward end of a tubular mounting structure or cell 146 (FIG. 3), the rearward end of which is recessed into and secured to the forward wall 148 of the movable camera housing 32, which is provided with a pair of laterally spaced openings 150 for the passage of the two parallel image-forming ray bundles. Each rhomboidal prism 128 is mounted on a supporting block 152 which in turn rests upon and is secured to the bottom wall 154 of the movable camera housing 32 (FIG. 3). Each triple-element lens 130 is mounted in a tubular cell 156 which in turn is mounted on a supporting block 158 which is also secured to and rests upon the bottom wall 154. Each mirror 138 is mounted on the inclined top of a supporting block 160 which also rests upon and is secured to the bottom wall 154.

Extending horizontally across the camera housing 32 between its opposite side walls 162 and rearwardly from the front wall 148 partway to the rear wall 164 thereof is an intermediate wall 166. Extending across and secured to the rearward edge of the intermediate wall 166 is an inclined stop strip or bar 168, the rearward face of which is cushioned against the impact of the forward edge of the upwardly swinging mirror-shutter 144. The mechanism which actuates the latter to swing it around its pivot axis 170 (FIG. 3) is described below. Meanwhile, it is sufficient to state that in its raised or solid line position resting against the cushioned stop strip 168, the front surface mirror 172, with its reflecting surface 173 forming the reflecting portion of the mirror-shutter 144 and secured to the pivoted plate 174, shuts off the light from the film chamber 176 (FIG. 3) and instead reflects the ray bundles rearwardly in a horizontal direction to and through their respective eyepieces or oculars 178 by which the imagery is viewed by the operator. The focal plane 140 is located at the same axial distance from the stationary mirrors 138 as the focal plane of the eyepieces 178.

Each eyepiece 178 consists optically of a biconvex forward element 180, an intermediate air-spaced biconcave element 182 and a rearward air-spaced plano-convex element 184. These elements collectively constitute each eyepiece lens 186. Each eyepiece lens 186 is mounted in a tubular eyepiece cell 188, the reduced diameter forward portion of which is mounted in a tubular support 190 which in turn is held in an apertured tubular mount 192. The two mounts 192 are similar in shape and construction, but are oppositely arranged as regards their integral arms 194 (FIG. 7) which are disposed parallel to one another in vertically spaced overlapping relationship. The mounts 192 for the purpose of providing a pupillary distance adjustment for the operator are laterally movable toward and away from one another between upper and lower guide grooves 196 and 198 (FIGS. 3 and 7) in an apertured guide plate 200 secured to the rear wall 164 of the camera housing 32 and held in these guide grooves 196 and 198 by retaining strips 202 and 204 respectively. Threaded into the guide plate 200 in the approximate midportion thereof between the arms 194 is a pivot screw 206 which pivotally supports a bent hand lever 208. The upright portion of the bent hand lever is drilled with over sized holes at equally spaced distances from the pivot screw 206 for the loose passage of screws 210, the excessive clearance providing, in effect, a pin-and-slot connection to compensate for the varying radii involved in the swinging of the hand lever 208. The lower portion of the hand lever 208 consists of an inclined handle 212 by which the hand lever 208 is operated to move the mounts 192 and consequently the eyepieces 178 supported thereby in opposite directions for interpupillary distance adjustment.

Mounted in the focal plane of each lens 186 of each eyepiece 178 is an illuminated ophthalmic fixation target plate 214 of transparent material and provided at its intersection with the optical axis of each eyepiece lens 186 with a fixation target 216. The latter may consist of an indentation or scratch, or etched or molded cross, depending on whether the fixation plate 214 is constructed of glass or transparent plastic. Leading upward to the lower edge of each target plate 214 is a passageway 218 (FIGS. 3 and 7) in the rear wall 164 of the camera housing 32, each passageway 218 being counterbored at its lower end to receive a miniature electric light bulb 220 of the type having an integral lens in the tip thereof, such as is used in otoscopes. Each light bulb 220 is engaged by a spring contact finger 222 secured at 224 to the recess bottom wall 154.

Each of the anchor screws 224 of the spring contact fingers 222 is connected through wiring (not shown) to a fixed contact 226 (FIG. 8) in a battery compartment 228 located at one end of the camera housing 32 (FIG. 5) and closed by an access plate 230. The other fixed contact 232 is connected by wiring (not shown) to the sides of the counterbores 234 in which the light bulbs 220 are located and which their sides engage in electrically conducting relationship. The contact portions of the counterbores 234 are of course insulated from the circuit containing the spring fingers 222. Mounted in the battery compartment 228, which is an extension of the camera housing 32, are two juxtaposed dry cells 236 (FIG. 8), their ends opposite the ends engaging the fixed contacts 226 and 232 being electrically interconnected by an approximately V-shaped spring member 238 bolted to a wall of the battery compartment 228.

MIRROR-SHUTTER CONSTRUCTION

The mechnanism 240 (FIGS. 3, 5, 12 and 13) operates the mirror-shutter 144 which includes the front surface mirror 172 and a supporting plate 174 pivoted to swing downward on the horizontal axis 170 in the dotted line position arcuate path (FIG. 3). In its upper solid line position it reflects the image-forming rays through the eyepieces 178 and at the same time obstructs the passage of light to the film chamber 176 in order to avoid fogging the film 142 therein. When, however, the mirror-shutter 144 is momentarily swung downward into its vertical position, it trips the actuator lever 237 of a microswitch 239 mounted on the bottom wall 154 between the fixed mirrors 138, igniting the flash bulb 52. The actual duration of exposure is governed by the "duration peak" of the flash bulb, which is 17.5 milliseconds with the M-3 bulbs.

Rotatably mounted as at 242 and 243 in the opposite side walls 162 (FIGS. 3, 5 and 12) is a pivot shaft 241, one side of which is cut away to provide a flat chordal surface 244 upon which the plate 174 is mounted in a plane parallel to the pivot axis 170 of the pivot shaft 241. The surface 244 is so spaced away from the pivot axis 170 as to cause the plane of the front surface 173 of the movable front surface mirror 172 to pass through the pivot axis 170. Mounted on the outer end 242 of the pivot shaft 241 is a crank arm 246 (FIG. 12) having an angled and rounded contact tip 248. A relatively weak spring 250, as explained below, but sufficient strong to overcome the weight of the mirror-shutter 144, urges the pivot shaft 241 in a counterclockwise direction and the crank arm 246 toward its upper position shown in solid lines in FIG. 12.

Figure 12:
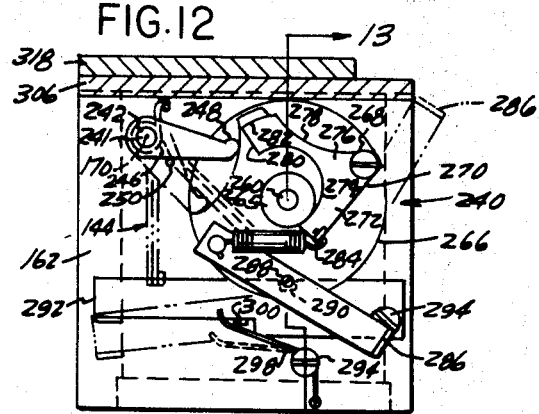
FIG. 12 is a vertical longitudinal section showing in side elevation the swinging mirror-shutter mechanism, taken along the line 12–12 in FIGS. 5 and 11.

The left-hand side wall 162 is bored as at 252 to receive a stepped bearing sleeve 254 containing a longitudinal bearing bore 256, the axis 258 of which is disposed in spaced parallel relationship with the pivot axis 170 of the mirror-shutter pivot shaft 241. Rotatably mounted in the bore 256 is a shutter operating shaft 260 on the inner end of which is mounted a collar 262 keyed, pinned or otherwise drivingly secured thereto. Surrounding the reduced diameter innermost portion of the bearing sleeve 254 is a strong torsion spring 264 (FIG. 13), one end of which is anchored to the adjacent side wall 162 and the other end to the collar 262 so as to urge the shutter-operating shaft 260 to rotate in a counterclockwise direction (FIG. 12). The spring 264 is termed "strong" in the sense that it is sufficient to overpower the so-called "weak" spring 250 and swing the crank arm 246 and mirror-shutter 144 downward as shown by the dotted line position thereof in FIG. 12.

In order to so engage and swing the crank arm 246 downward, there is mounted on and keyed or pinned or otherwise drivingly secured to the shutter-operating shaft 260 the hub 265 of a carrier disc 266. Near its periphery, the carrier disc 266 is drilled parallel to the axis 258 of the shaft 260 to receive a stepped pivot stud bolt 268. Pivotally mounted on the enlarged shank portion of the pivot bolt 268 is an acute-angled bellcrank lever 270. The bellcrank lever 270 has a lower arm 272 with an arcuately-cutout inner edge 274 adapted to provide clearance for swinging of the bellcrank lever 270 around its pivot bolt 268 and at the same time clear the hub 265 of the disc 266. The inner arcuate edge 274 is also the inner edge of the upper arm 276 of the bellcrank lever 270 which also has a concavely-arcuate outer edge 278 to provide clearance for the upward swinging of the crank arm tip 248. The upper arm 276 has an approximately radial contact end 280 adapted to engage and slide past the rounded contact tip 248 of the crank arm 246 and an arcuate cam edge 282 disposed approximately at right angles thereto sufficient to clear the rounded tip 248 when the contact end 280 has pushed the crank lever 246 downward to its dotted line position, as explained below in connection with the operation of the invention.

Figure 13:
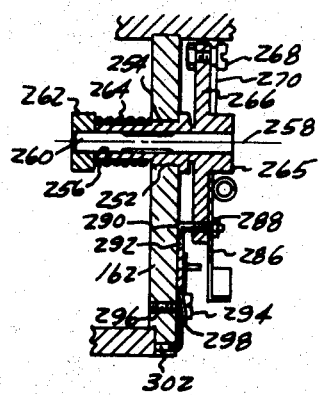
FIG. 13 is a vertical cross section taken along the line 13–13 in FIG. 12.

Mounted on the carrier disc 266 and engaging the lower or outer end of the lower arm 272 of the bellcrank lever 270 is a spring 284 which normally urges the arcuate inner edge 274 of the lower arm 272 against the hub 265 of the carrier disc 266, but permits yielding in the opposite direction in order to permit the arcuate cam portion 282 of the upper arm 276 to yield while sliding past the rounded tip 248 of the crank arm 246 during operation. Secured as by welding to the carrier disc 266 in a chordal position relatively thereto is a shutter-cocking arm 286 (FIGS. 12 and 13) which, when pressed downward from its dotted line to its solid line position of FIG. 12 winds up the torsion spring 264 (FIG. 13) by rotating the shutter-operating shaft 260 and cocks the shutter. The shutter carrier disc 266 is drilled parallel to its axis near its periphery and held in its cocked position by a locking lug or pin 288 (FIG. 13) which serves as a catch for engaging a notch 290 in the upper edge of a shutter release lever 292 which is drilled near its forward end to receive a pivot stud screw 294 threaded into a correspondingly-drilled and threaded hole 296 in the adjacent side wall 162 (FIG. 13). The lower edge of the shutter release lever 292 is engaged and urged upward around the pivot screw 294 in a clockwise direction by the upper arm of a torsion spring 298 pressing against a lug 300 on said lower edge, the spring 298 encircling the screw 294 and having its lower arm anchored in a hole 302 near the bottom edge of the adjacent side wall 162. Depressing the shutter release lever 292 pulls the notch 290 away from the pin 288 and releases the carrier disc 266 to operate the shutter and make an exposure in the manner described below in connection with the operation of the invention.

FILM WINDING AND REWINDING MECHANISM

The film winding and rewinding mechanism, generally designated 304, shown in FIGS. 3 to 5 and 9 to 11 inclusive is housed in the top of the camera housing 32 above a top wall 306 therein containing two laterally spaced circular framing apertures 308, the centers of which are spaced apart from one another at the same spacing of the optical axes of the stereoscopic photographic and viewing optical system 28 at the rearward ends of the triple element lenses 130 (FIG. 1) which is the same distance as the separation of the centers of the lower or fixed mirrors 138. The upper surface 310 of the apertured top wall 306 (FIG. 5) is made coincidental with the image plane 140 so that a photographic film 142 passing over it with its emulsion 141 facing downward is pressed downward by a pressure plate 314 so as to lie in the image plane or focal plane 140. The pressure plate 314 is resiliently urged downward upon the film 142 by leaf springs 316 attached to the underside of the cover 318 of the camera housing 32. Projecting longitudinally from each end of the cover 318 near the corners thereof are two laterally spaced lugs 317 and 319.

Figure 11:
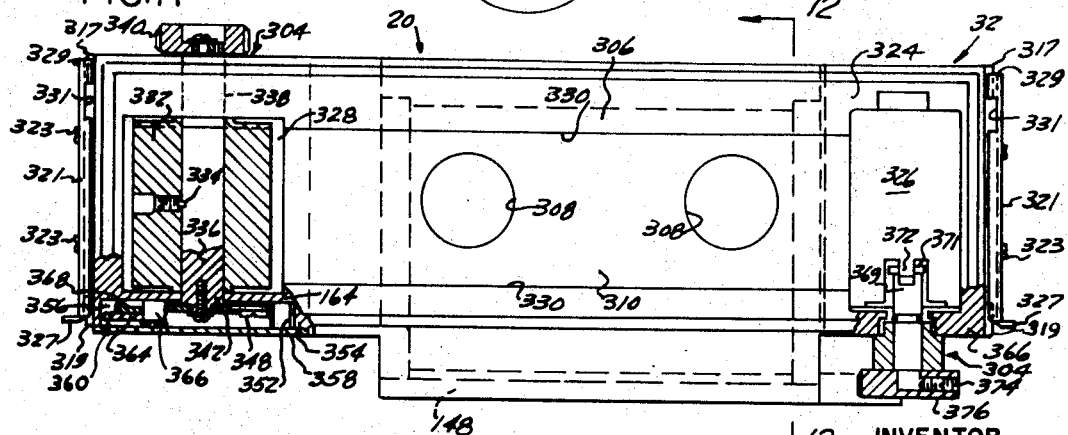
FIG. 11 is a horizontal section through the film compartment, taken along the line 11–11 in FIG. 5, with certain portions of the film transport winding mechanism shown in horizontal section in a slightly lower plane.
Figure 9:
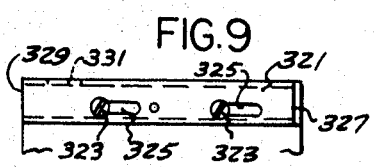
FIG. 9 is a fragmentary side elevation of the locking device for the film compartment, looking in the direction of the arrows 9–9 in FIG. 5.

Secured to each of the opposite ends of the camera housing cover 318 is a slidable releasable locking channel plate 321 (FIGS. 5, 9 and 11). Threaded into each of the outer end walls of the film housings 320 and 322 are two horizontally-spaced stud screws 323 whose smooth shank portions pass through aligned elongated slots 325 (FIG. 9) in each locking plate 321, which has a bent handle end 327. Formed in the upper flange of each channel plate 321 near the end 329 opposite the handle end 327 is a rectangular notch 331 slightly longer than the width of the adjacent lug 317. Shifting each locking plate 321 in FIG. 9 until the notch 331 registers with the adjacent lug 317 while the handle end 327 completely uncovers the opposite end lug 319, enables the opposite ends of the camera housing cover 318 to be lifted from their interfitting rib-and-groove connections with the top plate 306. The cover plate 318 may then be lifted off to remove an exposed film cartridge and replace it with an unexposed cartridge, as explained more fully below. The camera housing 32 adjacent the opposite ends of the top wall 306 is provided with a pair of open-topped box-shaped unexposed and exposed film housings 320 and 322 respectively secured to and depending from the top wall 306.

The film housing 320 contains an unexposed film chamber 324 for an unexposed film cartridge 326 (FIG. 11), the film from which proceeds upward, with the emulsion 141 down, through the image plane or focal plane 140 across the top surface 310 of the top wall 306 and downward into an exposed film chamber 328 into which the film 142 is wound after each exposure. The top wall 306 is provided with a guide groove 330 through which the film 142 travels between the shouldered side walls of the guide groove 330. Rotatably mounted in the exposed film chamber 328 is an exposed film winding drum or spool 332 (FIG. 11) drivingly connected by a set screw 334 to a shaft 336 journaled in a bore 338 in the front wall 148 of the camera housing 32 and having a winding knob 340 bolted or otherwise drivingly secured thereto. The drum or spool 332 is provided with a film-end-engaging toothed spring clip 333. The opposite end of the shaft 336 is journaled in the recessed rearward wall 164 of the camera housing 32 and bolted or otherwise drivingly secured thereto is a toothed gear wheel 342 engaged by the pointed tip 344 (FIG. 5) of a locking pawl 346. The pawl 346 is pivoted intermediate its opposite ends upon a pivot screw 348 threaded into the rear wall 164 and its lower end 350 projects downward outside and below the exposed film housing 322. One arm of a U-spring 352 engages and urges the upper end and pointed tip 344 of the pawl 346 into locking engagement with the teeth of the gear wheel 342 while the opposite arm thereof is bolted or otherwise secured to the side wall 354 of the recess 356 in the rear wall 164 of the camera housing 32. The recess 356 is closed by a cover plate 358.

The exposure counting mechanism, generally designated 360 (FIGS. 5, 10 and 11) includes a window 362 in the cover plate 358 through which is seen one of six exposure numbers on the periphery of a rotary exposure-indicating disc 364 for a 20-exposure cartridge 326. The exposure-counting disc 364 is loosely and rotatably mounted upon a pivot stud screw 366 (FIGS. 10 and 11) and is drivingly secured to a gear wheel 368 which meshes with the gear wheel 342. A convexo-concave or "bowed" spring washer 370 is mounted on the stud screw 366 adjacent the wall 164 and engages the gear wheel 368 for exerting frictional pressure upon the gear wheel 368 and exposure-indicating disc 364.

Journaled in the rear wall 366 of the unexposed film housing 320 (FIG. 11) is an axle 369 having a notched inner end 371 engageable with the usual diametral rib 372 on the outer end of the film spool (not shown) within the film cartridge 326. Drivingly secured to the axle 369, as by the setscrew 374, is a film rewinding knob 376. The axle 369 may be pulled outward to disengage its notched end 371 from the spool rib 372 and also to remove it entirely from the film cartridge 326 in order to insert another cartridge in reloading, whereupon the knob 376 and axle 369 may be pushed inward (FIG. 11) to reengage the notched end 371 with the spool rib 372.

As the effective relative aperture of the photographic optical system of this camera is approximately f/17, the correspondingly great depth of focus may render accurate focusing difficult for some operators. Accordingly, a scale (not shown) calibrated in diopters (+ ... 0 ... −) is mounted on the opposite side of the base 40 from that shown in FIG. 3, with which registers a pointer (also not shown) extending downward from the dovetail slide 102. After the refractive error of the eye to be photographed has been determined, the setting of the camera for focus may thereby be made with extreme accuracy.

OPERATION

In the operation of the invention, let it be assumed that the operator has inserted an unexposed color film cartridge 326 in the chamber 324 and has threaded the leader strip of the film 142, emulsion down, through the guide groove 330 in the top wall 306 and has hooked it onto the clip 333 on the exposed film winding drum 332. The operator then rotates the winding knob 340 and the winding drum 332 to wind thereon the length of fogged leader strip which was exposed outside the film cartridge 326 when the film 142 was being threaded. This length of fogged film 142 is equivalent to the number of exposures seen in the window 362 necessary to equal the length of film initially exposed in threading it. He then pushes the thumb of his hand against the exposed lower rim portion of the exposure counting disc 364 to rotate it until the exposure number "1" appears in the window opening 362.

The operator now cocks or sets the shutter mechanism 240 by pushing downward upon the shutter-cocking arm 286, moving it from its upper dotted line position of FIG. 12 to its lower solid line position therein. This action rotates the carrier disc 266 through an angle of approximately 90° and causes its locking pin 288 to snap into the locking notch 290, pushing the shutter release lever 292 downward around its pivot 294 against the urge of the spring 298 until it does so. At the same time, the rotation of the carrier disc 266 and the consequent rotation of the shaft 260 and collar 262 winds up the stronger torsion spring 264 and brings the bellcrank lever 270 to its solid line position of FIG. 12. Meanwhile, the spring 284 is pressing the lower arm 272 of the bellcrank lever 270 against the disc hub 265 and the weaker spring 250 is urging the crank arm 246 and the mirror-shutter 144 into their uppermost or solid line positions shown in FIGS. 3 and 12.

Meanwhile, the patient's eye E (FIG. 14), the fundus F of which is to be photographed, has been anaesthetized and its pupil P dilated by the use of a mydriatic. The operator then inserts the above-mentioned speculum S against the sclera outside the patient's cornea C beneath the eyelids L and brings the nose of the camera 20 adjacent the speculum so that the periphery of the mask disc 94 interfits with the recess in the front of the speculum. The operator then turns on the viewing light bulb 60 and rotates the focusing knob 108 to move the movable camera housing 32 and its movable optical unit 30 back and forth while he asks the patient to fix his gaze upon the fixation target 216, which meanwhile has been illuminated by the energization of the light bulb 220 from the dry cells 236.

While this is occurring, the light from the illuminating bulb 60 passes through the condenser 58 and flash bulb 52 to the mirror 86 where it is reflected as a parallel-ray pencil through the illuminating system objective lens 90 and the lower central hole 92 in the mask disc 94 (FIGS. 3 and 6), whence it reaches the cornea, enters the dilated pupil of the patient's eye and arrives at the fundus. The light reflected from the fundus passes outward through the optical system of the eye including the cornea C and lens O thereof and thence emerges and divides into two laterally spaced pencils formed by the two laterally spaced holes 98 in the mask disc 94. These ray pencils are displaced laterally by the rhomboidal prisms 114 (FIG. 1) and are caused to become convergent by the objective lenses 116 in the stationary optical unit 26. These convergent ray pencils, proceeding along parallel optical axes, are brought to a focus in the viewing focal plane coincident with the fixation target 216 after refraction and image erection, by the positive field lenses 126 and triple element lenses 130 in the course of which they are again displaced laterally away from one another and reflected vertically by the stationary mirrors 138 and again reflected horizontally by the movable mirror 172 of the mirror-shutter 144, which at this time is in its raised solid line position of FIGS. 2 and 3. This optical action also juxtaposes the images on the emulsion 141 of the film 142 in proper position for stereoscopic viewing in a stereoscope without requiring this to be done manually by subsequent operations, as in conventional stereoscopes.

When the operator, while looking through the eyepieces 186 and rotating the focusing knob 108, obtains a clear and sharp image of the fundus as the patient's gaze is fixed upon the fixation target 216, the operator depresses the shutter release lever 292 (FIG. 12), causing the locking notch 290 therein to move downward away from the pin or lug 288, unlocking the carrier disc 266. Under the torque of the torsion spring 264, the disc 266 rotates rapidly in a counterclockwise direction, causing the front end 280 of the upper arm 276 of the bellcrank lever 270 to engage the rounded tip 248 and push downward upon it, its stronger spring 264 overpowering the weaker spring 250 and swinging the crank arm 246 and mirror-shutter 144 from their solid line positions to their dotted line positions (FIGS. 3 and 12) through an angle of about 45 degrees. When the mirror-shutter 144 swings downward into its approximately vertical position, it pushes downward upon the microswitch actuating lever 237, closing the microswitch 239 and firing the flash bulb 52. Meanwhile, the ray bundles pass upward into the film chamber 176 and through the circular framing apertures 308 onto the film emulsion 141 in the focal plane 140, exposing the film 142.

When the lowermost position of the crank arm 246 is reached, the rounded tip 248, which meanwhile has been sliding approximately radially across the bellcrank lever end 280, reaches the corner thereof and slides off, whereupon the weaker spring 250 swings the mirror shutter 144 upward against the stop bar 168, terminating the exposure. The operator or his assistant then rotates the winding knob 340 until a new exposure number on the exposure counting disc 364 appears in the window 362. A new exposure may then be made, and so on until the film 142 in the film cartridge 326 is completely exposed. To photograph the fundus of the patient's other eye, the foregoing procedure is repeated with the other eye anaesthetized, its pupil dilated and the speculum inserted therein.

When the film cartridge 326 has been completely exposed, as indicated by the final number appearing in the window 362, the operator pushes the handle 350 of the locking pawl 346 to the left to withdraw the pointed tip 344 thereof out of locking engagement with the gear wheel 342 while at the same time he rotates the rewinding knob 376 to consequently rotate the spool (not shown) inside the film cartridge 326 and thus rewind the film 142 back into the cartridge 326 in a manner similar to that carried out with conventional 35 mm. photographic cameras. He then removes the exposed cartridge 326 by pulling the knob 376 and axle 369 out of the cartridge 326 (FIG. 11), after which he unlocks and lifts off the cover 318, in the manner described above, and inserts an unexposed cartridge 326 in its place.

From the foregoing description and drawings it may be observed that the first pair of images formed by the objective lenses 116 of the stationary optical unit 26 are focused upon the forward faces of their respective field lenses 126 which are movable for focusing. These images are erected by the image-erecting subsystems 124 and fall on the film image plane or focal plane 140.

I claim:

1. A simultaneous-exposure stereophotographic fundus camera for taking instantaneous stereoscopic photographs of the fundus of the eye, said camera comprising a speculum having a marginal portion which is curved rearwardly around a central opening to fit against the sclera and behind the eyelids of the eye being photographed and also having on the front thereof a camera-locating portion, a camera housing having a rearward housing structure containing a film compartment with film holding and transporting means therein and a forward housing structure extending forwardly from said rearward structure and terminating forwardly in a nose portion of reduced size configured to be inserted beneath the eyebrow and engage and fit the camera-locating portion of the speculum engaging the eye being photographed, said nose portion containing a light exit aperture and a pair of light entrance apertures, said apertures being spaced apart from one another but disposed closely adjacent to one another and of sufficiently small size to pass an incident light ray pencil through the exit aperture and speculum opening and receive a pair of refracted light ray pencils passing out through the dilated pupil of an eye disposed adjacent thereto for stereophotography and through the speculum opening and entrance apertures;

an illuminating optical system aligned with said exit aperture and including a light source arranged to project an illuminating light ray pencil through said exit aperture;

a stereophotographic optical system containing two independent optical subsystems mounted in spaced predominantly parallel axis relationship in said housing and including oppositely-facing reflectors arranged to widen the separation of said refracted pencils a plurality of times their initial separation while passing through said entrance apertures, said optical subsystems including objective lenses adapted to be focused directly upon the fundus of the eye in combination with the optical system of the eye, said optical subsystems being constructed and arranged to focus a pair of stereoscopic images of the fundus on a photographic focal plane on the film in positions at separations adapted for stereoscopic viewing;

a pair of laterally spaced eyepieces disposed coaxial with said optical subsystems at focal distances therefrom corresponding to the focal distance therefrom of said photographic image plane; and a movable reflector movable from a position shielding said photographic image plane and film from the light rays emergent from said optical subsystems and directing said rays into said eyepieces to a position exposing said photographic image plane to said emergent rays.

2. A simultaneous-exposure stereophotographic fundus camera, according to claim 1, wherein a shutter is disposed between said photographic focal plane and said optical subsystems, and wherein said illuminating optical system light source includes a translucent viewing light emitter and an independent translucent film-exposure light emitter disposed in tandem along the optical axis of said illuminating optical system with the light from one emitted adapted to pass through the other emitter on its way to said exit aperture, and means for operating said film-exposure light emitter in timed relationship with said shutter.